(12) United States Patent
Kwon et al.

(10) Patent No.: US 10,607,057 B2
(45) Date of Patent: Mar. 31, 2020

(54) ELECTRONIC DEVICE INCLUDING BIOMETRIC SENSOR

(71) Applicant: Samsung Electronics Co., Ltd., Gyeonggi-do (KR)

(72) Inventors: Oh-Hyuck Kwon, Gyeonggi-do (KR); Hyung-Dal Kim, Gyeonggi-do (KR); Joung-Min Cho, Seoul (KR); Jeong-Min Park, Gyeonggi-do (KR); Hyung-Sup Byeon, Gyeonggi-do (KR); Heung-Sik Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/856,470

(22) Filed: Dec. 28, 2017

(65) Prior Publication Data
US 2018/0204040 A1 Jul. 19, 2018

(30) Foreign Application Priority Data

Jan. 13, 2017 (KR) .................... 10-2017-0006299

(51) Int. Cl.
*G06K 9/00* (2006.01)
*G06F 1/16* (2006.01)
(Continued)

(52) U.S. Cl.
CPC ......... *G06K 9/0004* (2013.01); *G06F 1/1626* (2013.01); *G06F 1/1684* (2013.01);
(Continued)

(58) Field of Classification Search
CPC ............. G06K 9/04883; G06K 9/0002; G06F 1/1626; G06F 1/1684; G06F 1/3215;
(Continued)

(56) References Cited

U.S. PATENT DOCUMENTS 8,947,627 B2 2/2015 Rappoport et al.
10,222,648 B2 * 3/2019 Qin .................. G02F 1/133504
(Continued)

FOREIGN PATENT DOCUMENTS

EP 0 886 958 B1 4/2001
EP 3 054 370 A1 8/2016
(Continued)

OTHER PUBLICATIONS

International Search Report dated Apr. 16, 2018.
European Search Report dated Sep. 26, 2019.

*Primary Examiner* — Prabodh M Dharia
(74) *Attorney, Agent, or Firm* — Cha + Reiter, LLC

(57) ABSTRACT

According to the present disclosure, an electronic device may include a housing forming a first portion of an outer surface of the electronic device and a display received in the housing and forming a second portion of the outer surface. The display may include a biometric sensor formed between a first pixel and a second pixel and a waveguide substantially perpendicular to the biometric sensor and extending from the biometric sensor to the second portion. In an electronic device, light or ultrasonic waves may be put to use in sensing the user's biometric information (e.g., fingerprint information) using a biometric sensor positioned in a portion of the display, presenting better performance.

20 Claims, 10 Drawing Sheets

(51) Int. Cl.
  *G06F 1/3215* (2019.01)
  *G06F 3/041* (2006.01)
  *G06F 3/042* (2006.01)
  *G06F 3/043* (2006.01)
  *G06F 3/044* (2006.01)
(52) U.S. Cl.
  CPC ............ *G06F 1/3215* (2013.01); *G06F 3/043* (2013.01); *G06F 3/044* (2013.01); *G06F 3/0412* (2013.01); *G06F 3/0416* (2013.01); *G06F 3/0421* (2013.01); *G06K 9/0002* (2013.01)
(58) Field of Classification Search
  CPC .... G06F 3/0412; G06F 3/0416; G06F 3/0421; G06F 3/043; G06F 3/044
  USPC .................................. 345/173, 207; 382/115
  See application file for complete search history.

(56) References Cited

U.S. PATENT DOCUMENTS

| | | | | |
|---|---|---|---|---|
| 10,268,884 | B2* | 4/2019 | Jones | G06K 9/0053 |
| 2004/0252867 | A1 | 12/2004 | Lan et al. | |
| 2009/0302361 | A1 | 12/2009 | Park | |
| 2010/0252846 | A1* | 10/2010 | Bierhuizen | G02B 6/0021 257/98 |
| 2010/0271273 | A1* | 10/2010 | Stjernman | H01Q 1/2266 343/702 |
| 2013/0278578 | A1* | 10/2013 | Vetsuypens | G09G 3/20 345/207 |
| 2014/0133711 | A1* | 5/2014 | Abe | G06K 9/036 382/115 |
| 2014/0354596 | A1 | 12/2014 | Djordjev et al. | |
| 2014/0354597 | A1 | 12/2014 | Kitchens, II et al. | |
| 2015/0116484 | A1 | 4/2015 | Kim et al. | |
| 2015/0198686 | A1* | 7/2015 | Paul | G01R 33/4818 324/309 |
| 2015/0254495 | A1* | 9/2015 | Rowe | G06K 9/00033 382/124 |
| 2015/0294099 | A1* | 10/2015 | Frye | G06F 21/32 340/5.83 |
| 2016/0178842 | A1* | 6/2016 | Goi | G02B 6/126 385/11 |
| 2016/0314729 | A1* | 10/2016 | Gutierrez | G09G 3/02 |
| 2017/0003649 | A1* | 1/2017 | Sinha | G03H 1/0011 |
| 2017/0220844 | A1* | 8/2017 | Jones | G06K 9/0053 |
| 2018/0014846 | A1* | 1/2018 | Rhee | B06B 3/00 |
| 2018/0031686 | A1* | 2/2018 | Kuo | G01S 7/52017 |
| 2018/0129798 | A1* | 5/2018 | He | G06K 9/00013 |
| 2019/0138154 | A1* | 5/2019 | Smith | G06K 9/00013 |

FOREIGN PATENT DOCUMENTS

| | | |
|---|---|---|
| KR | 10-2016-0014708 A | 2/2016 |
| KR | 10-2016-0059342 A | 5/2016 |
| WO | 2015/054686 A1 | 4/2015 |
| WO | 2016/154378 A1 | 9/2016 |
| WO | 2016/205832 A1 | 12/2016 |

* cited by examiner

US 10,607,057 B2

ELECTRONIC DEVICE INCLUDING BIOMETRIC SENSOR

CLAIM OF PRIORITY

This application claims the benefit under 35 U.S.C. § 119(a) of a Korean patent application filed in the Korean Intellectual Property Office on Jan. 13, 2017 and assigned Serial No. 10-2017-0006299, the entire disclosure of which is incorporated herein by reference.

TECHNICAL FIELD

Embodiments of the present disclosure generally relate to electronic devices with a waveguide that provides light and/or sound wave paths for biometric sensors.

DISCUSSION OF RELATED ART

Typically, displays are apparatuses for outputting text or images. Most electronic devices that have information communication functionality come with a display. The development of relevant technology has led to better displays with improved performance. The display may be integrated with a touch panel, allowing it to be used as an input device as well as an output device.

These touch panel may generate position and motion information based on user inputs detected on the touch panel. Further, such electronic devices may also recognize and identify the user using biometric information such as fingerprint, voice, facial features, or iris patterns. Use of portable electronic devices have become increasingly common, and with this increase in usage, these portable electronic devices increasingly may include financial, security, or other personal information of the user. Thus, there is a growing need for locking electronic devices. Vigorous development efforts are underway for electronic devices capable of locking and unlocking using the user's biometric information.

A conventional electronic device may include a touch panel that provide X and Y coordinates of touch inputs detected on the touch panel. The electronic device may also come with a fingerprint recognition sensor capable of recognizing the user.

Conventional fingerprint recognition sensors are hardware components that are separate from the display. Thus, they requires a separate space on the surface of the electronic device apart from the display. But this may not be desirable due to the recent trend of providing mobile devices with slim bezels.

The above information is presented as background information only to assist with an understanding of the present disclosure. No determination has been made, and no assertion is made, as to whether any of the above might be applicable as prior art with regard to the present disclosure.

SUMMARY

In an electronic device according to an embodiment of the present disclosure, a fingerprint sensor is placed in a portion of the display, addressing the issue of limited space.

In sensing the user's fingerprint information using a fingerprint sensor positioned in the display, a waveguide for providing a path along which light or ultrasonic waves travel may be positioned inside the display.

According to an embodiment of the present disclosure, an electronic device may comprise a housing forming a first portion of an outer surface of the electronic device and a display received in the housing and forming a second portion of the outer surface. The display may include a biometric sensor formed between a first pixel and a second pixel and a waveguide substantially perpendicular to the biometric sensor and extending from the biometric sensor to the second portion.

According to an embodiment of the present disclosure, an electronic device may comprise a housing including at least a portion of an outer surface of the electronic device and a display disposed inside the housing and including a mutually exclusive first area and second area. A biometric sensor and a waveguide may be disposed in the first area on a first layer, the biometric sensor being configured to sense a user's fingerprint, and the waveguide forming a path along with light or sound wave transmitted from or received by the biometric sensor propagates. A plurality of pixels may be arranged in the first area and the second area on at least a second layer different from the first layer.

According to an embodiment of the present disclosure, a display included in an electronic device may comprise a plurality of pixels disposed on a first layer, each pixel configured to output one or more colors, a plurality of TFT layers disposed under the first layer to control the plurality of pixels and including at least one opening, and a waveguide formed in the at least one opening and forms a path for light or sound wave to propagate to a biometric sensor disposed in the display.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
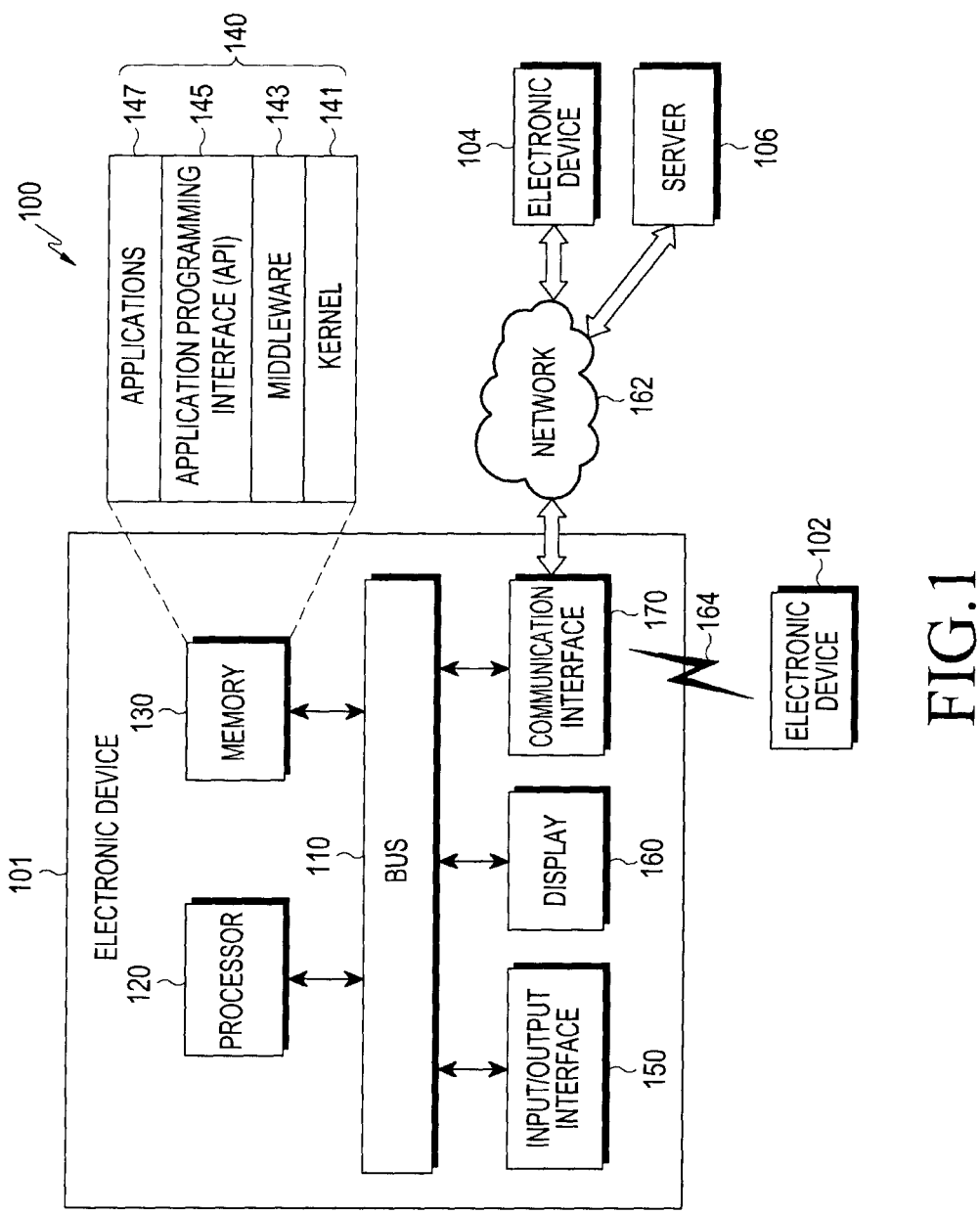
FIG. 1 is a block diagram illustrating an electronic device in a network environment according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents thereto also belong to the scope of the present disclosure. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third intervening element.

The expression "configured to" used herein may mean "suitable for," "having the capacity to," "designed to," "adapted to," "made to," or "capable of" As such, the term "configured to" does not necessarily mean only "specifically designed to" in hardware. Instead, the expression "a device configured to" may mean that the device is "capable of" operating together with another device or other components. A "processor configured to perform A, B, and C," for example, may mean a dedicated processor (e.g., an embedded processor) for performing the specified operation or a generic-purpose processor (e.g., a central processing unit (CPU) or an application processor) which may perform the specified operation by executing one or more software programs which are stored in a memory device.

Electronic devices according to various embodiments of the present disclosure may be smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessories, electronic tattoos, smart watches, and the like.

According to another embodiment, the electronic devices may be home appliances, such as televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like According to another embodiment, the electronic devices may be medical devices (e.g., various portable medical measurement devices, such as blood glucose monitoring devices, heartbeat measuring devices, blood pressure measuring devices, body temperature measuring devices, etc., magnetic resonance angiography (MRA) devices, magnetic resonance imaging (MRI) devices, computed tomography (CT) devices, medical scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales devices (POSs), or IoT (Internet of Things) devices (e.g., light bulbs, sensors, electric or gas meters, sprinkler devices, fire alarms, thermostats, street lamps, toasters, exercise equipment, hot water tanks, heaters, boilers, and the like.

According to another embodiment, the electronic devices may be parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described devices or a combination thereof. An electronic device according to an embodiment may be a flexible device. Furthermore, an electronic device according to an embodiment may not be limited to the above-described electronic devices and may include other electronic devices developed in the art.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Referring to FIG. 1, according to an embodiment of the present disclosure, an electronic device 100 is included in a network environment 100. The electronic device 100 may include a bus 110, a processor 120, a memory 130, an input/output interface 150, a display 160, and a communication interface 170. In some embodiments, the electronic device 100 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 100, and/or perform an operation or data processing relating to communication. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or nonvolatile memory. For example, the memory 130 may store commands or data related to at least one other component of the electronic device 100. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 100 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 100 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), Bluetooth, Bluetooth low power (BLE), Zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 100. According to an embodiment of the present disclosure, all or some of operations executed on the electronic device 100 may be executed on another or multiple other electronic devices (e.g., the electronic devices 102 and 104 or server 106). According to an embodiment of the present disclosure, when the electronic device 100 should perform some function or service automatically or at a request, the electronic device 100, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 100. The electronic device 100 may provide a requested function or service by processing the received result as it is or additionally. To that end, a cloud computing, distributed computing, or client-server computing technique may be used, for example.

Figures 2A, 2B:
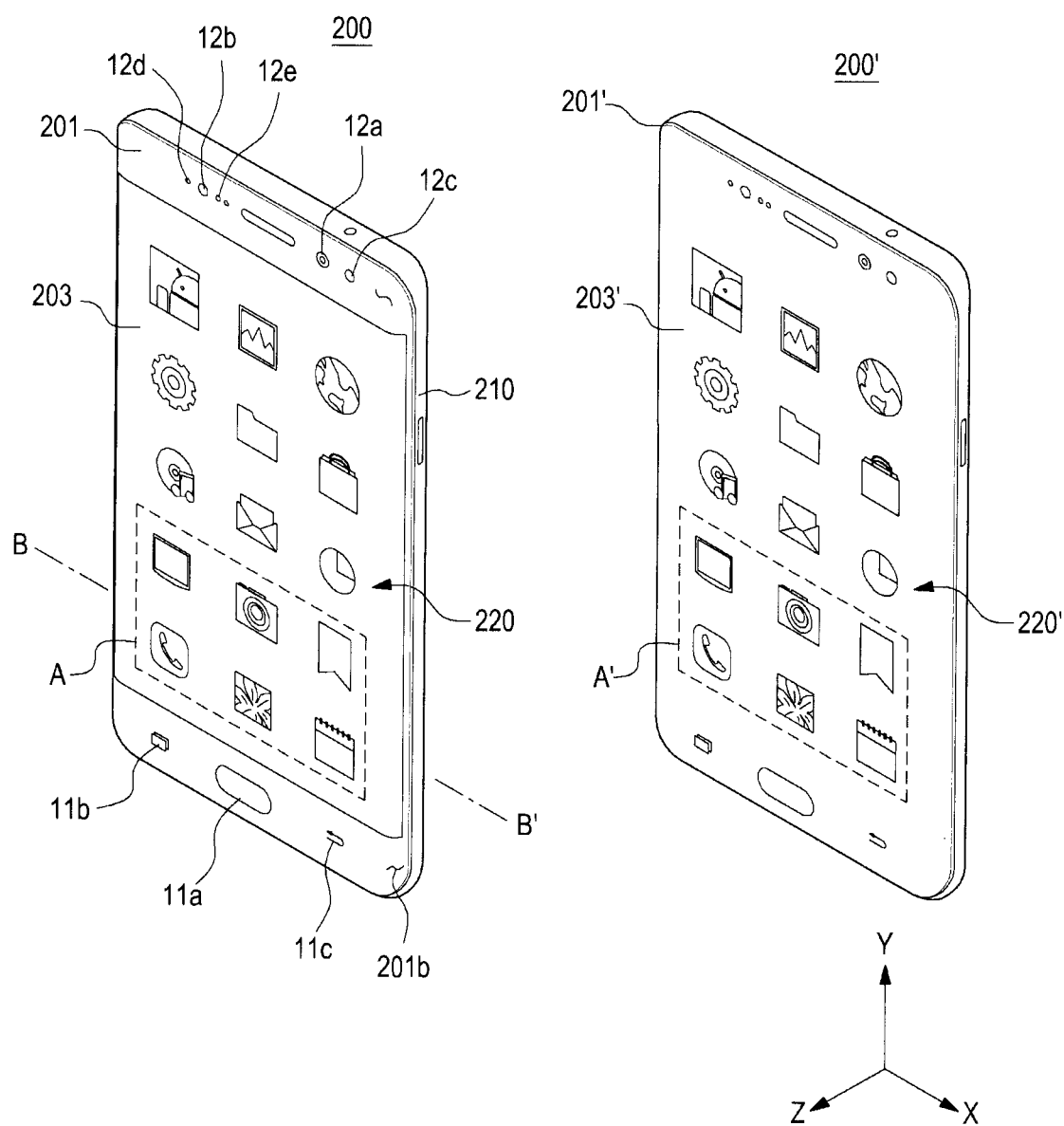
FIG. 2A is a perspective view illustrating an electronic device 200 according to an embodiment of the present disclosure.
FIG. 2B is a perspective view illustrating an electronic device 200' according to an embodiment of the present disclosure.
Figure 3:
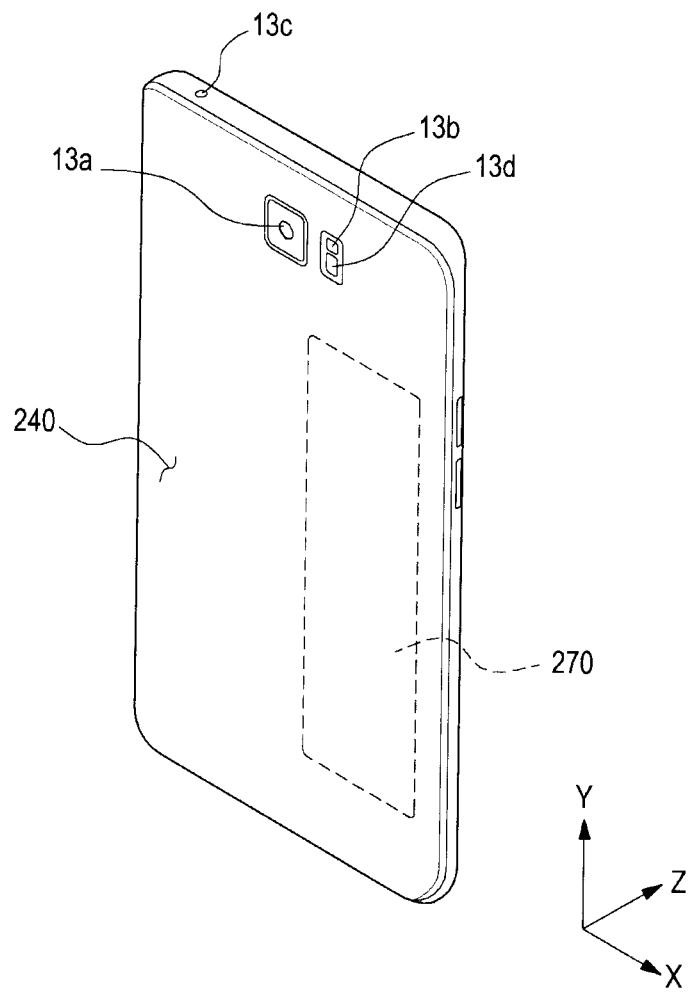
FIG. 3 is a perspective view illustrating an electronic device 200 or 200' as viewed in a different direction according to various embodiments of the present disclosure.

FIG. 2A is a perspective view illustrating an electronic device 200 according to an embodiment of the present disclosure. FIG. 2B is a perspective view illustrating an electronic device 200' according to another embodiment of the present disclosure. FIG. 3 is a perspective view illustrating the electronic device 200 or 200' as viewed in a different direction according to various embodiments of the present disclosure.

In the rectangular coordinate system as shown in FIGS. 2A to 3, 'X,' 'Y,' and 'Z,' respectively, may denote the width direction of the electronic device 200 or 200', the length direction of the electronic device 200 or 200', and the thickness direction of the electronic device 200 or 200'. As used herein, "first direction (+Z)" may refer to a direction perpendicular to the transparent plate 203 or 203', and "second direction (−Z)" may refer to the opposite direction of "first direction (+Z)." The description of FIG. 2A may apply to FIG. 2B, and differences alone are described below separately.

Referring to FIGS. 2A to 3, an electronic device 200 (e.g., the electronic device 100 of FIG. 1) may include a housing 210 and a display 220 (e.g., the display 160 of FIG. 1). The housing 210 may include a first surface 201 facing in the first direction (+Z) and a second surface 240 facing in a second direction (−Z) which is opposite of the first direction (+Z). The first surface 201 may be the front surface of the housing 210, and the second surface may be the rear cover 240 (refer to FIG. 3). The first surface 201 may have a front opening. A transparent cover 203 of the display 220 may be provided to form at least part of the front surface 201 of the housing 210, such that the transparent cover 203 fits in the front opening of the first surface 201. The electronic device 200 may have a keypad below the transparent cover 203. The keypad may include buttons or touch keys 11a, 11b, and 11c. The touch keys 11a, 11b, and 11c may generate input signals as they are touched by a part of the user such as a finger. According to an embodiment of the present disclosure, the keypad may be implemented to include only mechanical buttons or only touch keys. As another example, the keypad may be implemented using a mix of mechanical buttons and touch keys. The keypad may provide different inputs depending on shorter or longer presses of the keys.

According to an embodiment of the present disclosure, the housing 210 may house various electronic parts. At least part of the housing 210 may be made of a conductive material. For example, the housing 210 may have side walls that form outer side surfaces of the electronic device 200. Portions of the housing 210, which are exposed to the outside of the electronic device 200, may be made of metal. A printed circuit board (not shown) and/or a battery 270 (refer to FIG. 3) may be disposed inside the housing 210. Processors, communication modules, various interfaces (e.g., the interfaces 150 and 170 of FIG. 1), and/or power management modules may be mounted on the printed circuit board.

A first camera 12A, a light source unit 12b, and/or an iris camera 12c may be provided above the transparent cover 203. For example, the light source unit 12b may be an infrared (IR) light emitting diode (LED). The iris camera 12c may take an image of the user's eyes using the near infrared light emitted from the IR LED. As another example, a light source unit indication lamp 12d and an illuminance sensor or proximity sensor 12e may be also included. Referring to FIG. 3, a second camera 13a, a heart rate sensor (or heart rate monitor (HRM)) 13d, and/or a flash 13b may be provided on the rear surface 240 of the electronic device 200. A microphone 13c may be provided on the upper portion of the electronic device 200.

The display 220 may be exposed through the transparent cover 203. At least a portion of the display 220 may be made of a material that transmits radio waves or magnetic fields. The display 220 may be mounted on the front surface of the housing 210. The display 220 may include a display panel that is mounted beneath the transparent cover 203, where the transparent cover 203 is made of reinforced glass. A touch panel may be provided between the transparent cover 203 and the display panel. When the touch panel is included, the display 220 may function as a touchscreen capable of both input and output operations.

The display 220 may include a dielectric layer and an optical layer. The dielectric layer may be in contact with the transparent cover 203. The dielectric layer may made of, e.g., silicone, air, foam, membrane, optical clear adhesive (OCA), sponge, rubber, ink, or a polymer (e.g., polycarbonate (PC) or PET). The optical layer may be disposed beneath the dielectric layer such that the dielectric layer is between the transparent cover 203 and the optical layer.

Content displayed by the display panel may be transmitted through the optical layer. At least one optical layer may be layered on the display panel. For example, the optical layer may include an optical compensation film (e.g. a polarizing film) to calibrate the phase difference of the content outputted from the display panel. As another example, when the display has touchscreen capability, the optical layer may be an indium-tin-oxide (ITO) that functions as the touch panel.

The electronic device 200 may include a rear cover 240 to protect the rear surface of the housing 210. The rear cover 240 is mounted on the opposite side of the electronic device 200 as the display 220. The rear cover 240 may be made of a material capable of transmitting radio waves or magnetic fields, e.g., reinforced glass or synthetic resin. The rear cover 240, along with the housing 210 and the display 220, may form the exterior of the electronic device 200.

Referring to FIG. 2A, in the electronic device 200, a biometric sensing area (e.g., a fingerprint sensing area A) for recognizing biometric information (e.g., fingerprint information) may be formed in at least a portion of the display. The fingerprint sensing area A may obtain biometric information of the user using the display.

Referring to FIG. 2B, in the electronic device 200, a biometric sensing area (e.g., a fingerprint sensing area A) for recognizing biometric information (e.g., fingerprint information) may be formed in at least a portion of the display. In FIG. 2B, the display 220' may be expanded to cover substantially the entire front surface 201'. The fingerprint sensing area A may be formed in the expanded display to obtain biometric information of the user using the display.

Hereinafter, the fingerprint sensor for sensing fingerprint information of the user through the fingerprint sensing area A and a structure for delivering light or a sound wave (e.g., ultrasonic wave) to the fingerprint sensor are described below.

Figure 4:
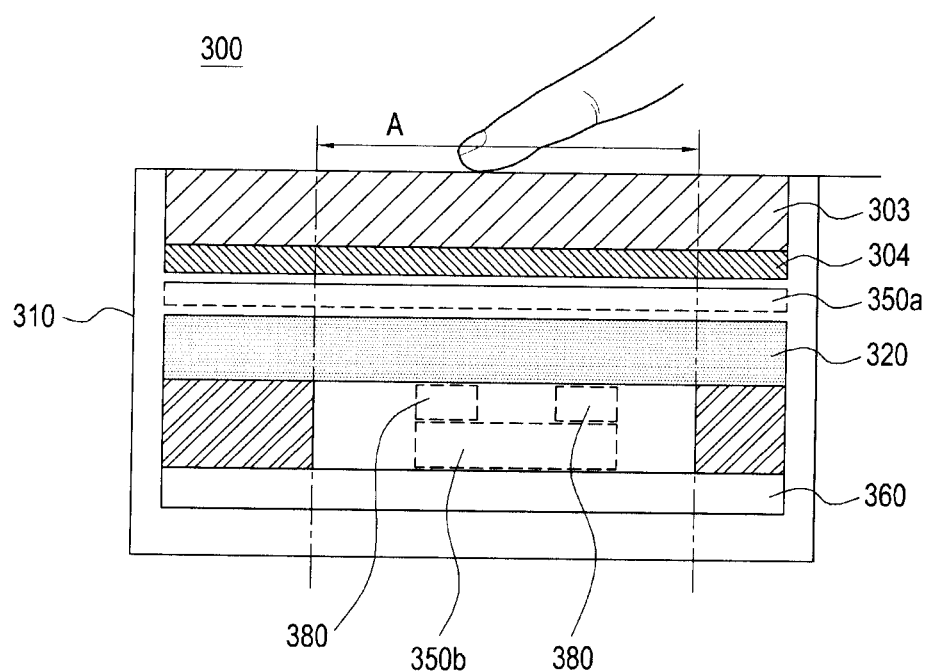
FIG. 4 is a cross-sectional view taken along line B-B' of FIG. 2A, according to an embodiment of the present disclosure.

FIG. 4 is a cross-sectional view taken along line B-B' of FIG. 2A, according to an embodiment of the present disclosure. Referring to FIG. 4, a housing 310, a transparent cover 303, and a display 320 of an electronic device 300 may partially or wholly be the same as the housing 210 or 210', the transparent cover 203 or 203', and the display 220 or 220', respectively, of FIGS. 2A and 2B.

Referring to FIG. 4, the electronic device 300 may include a housing 310, a transparent cover 303, a display 320, a biometric sensor 350a or 350b, and a printed circuit board 360. The transparent cover 303 may be coupled with the biometric sensor 350a or 350b or the display 320 via an adhesive layer 304.

According to an embodiment of the present disclosure, the electronic device 300 may include a biometric sensor for sensing a user's biometric information through the display 320. The biometric sensor may be the fingerprint sensor 350a or 350b.

In the electronic device 300, a first fingerprint sensor 350a may be disposed on a front surface (e.g. the top surface as shown in FIG. 4) of the display 320. The first fingerprint sensor 350a may be disposed between the transparent cover 303 and the display 320 and may sense the user's fingerprint on the fingerprint sensing area A. In the electronic device 300, a second fingerprint sensor 350b may be disposed on a rear surface of the display 320 (e.g. below the display 320 as shown in FIG. 4).

The fingerprint sensor 350a or 350b may be configured as ultrasonic fingerprint sensors for sensing the user's fingerprint using ultrasonic waves. For example, ultrasonic wave fingerprint sensors include ultrasonic wave transmitters/receivers adjacent the ultrasonic wave fingerprint sensor.

In another embodiment, the fingerprint sensor 350a or 350b may be a capacitive sensor where sensing electrodes are formed on the surface of the display 320. Alternatively, the fingerprint sensor 350a or 350b may be an optical fingerprint sensor that uses light emitted from the display 320 as a light source. The light may be emitted from one or more red (R), green (G), and/or blue (B) pixel of the display 320. Alternatively, a light source (e.g., an infrared (IR) light emitting diode (LED)) may be separately provided in the display 320.

The fingerprint sensor 350a or 350b may be transparent. In particular, the fingerprint sensor 350a on the top surface of the display 320 may be transparent so as to allow transmission of light outputted from the display 320.

The electronic device 300 may further include a shock absorber 380 to protect the second fingerprint sensor 350b against damage due to external impact. The shock absorber 380 may be disposed between the second fingerprint sensor 350b and the display 320. As shown, the shock absorber 380 is implemented as a plurality of shock absorbers 380 provided at both ends of the second fingerprint sensor 350b. However, the arrangement and number of shock absorbers 380 are not limited thereto, and various arrangements for the shock absorbers 380 to protect the second fingerprint sensor 350b are possible.

A printed circuit board 360 may be disposed under the second fingerprint sensor 350b. It may be electrically connected to the second fingerprint sensor.

Figure 5:
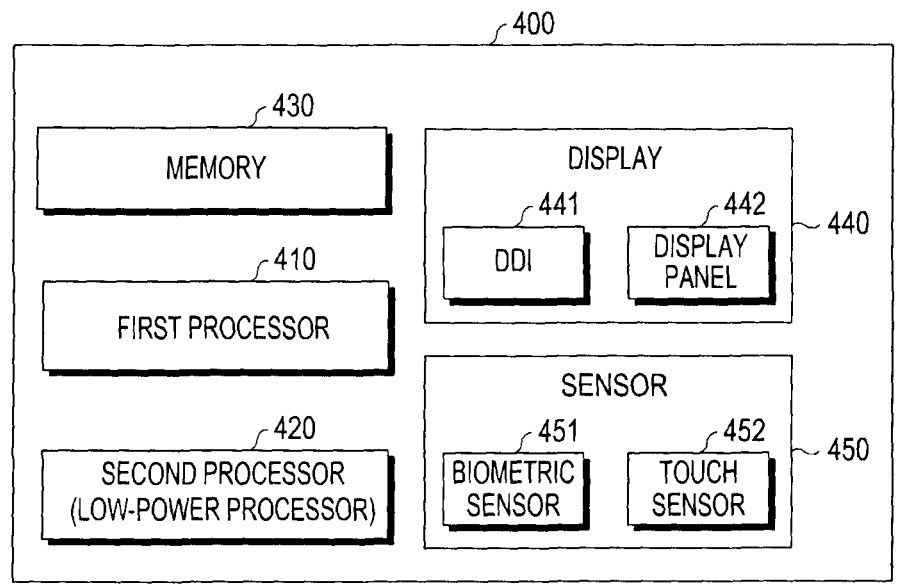
FIG. 5 is a block diagram of an electronic device 400 according to an embodiment of the present disclosure.

FIG. 5 is a block diagram of an electronic device 400 according to an embodiment of the present disclosure.

Referring to FIG. 5, the electronic device 400 may include at least one processor (e.g., a first processor 410 or a second processor 420), a memory 430, a display 440, or at least one sensor 450. The processor 410 or 420, memory 430, and display 440 of the electronic device 400 shown in FIG. 5 may partially or wholly be the same as the processor 120, memory 130, and display 160 of FIG. 1.

According to an embodiment of the present disclosure, the first processor 410 may control the overall operation of the electronic device 400. The second processor 420 (e.g., a low-power processor), on the other hand, may be dedicated to process inputs obtained from the at least one sensor 450 when the first processor 410 is in sleep mode. The second processor 420 may operate without waking up the first processor 410. The second processor 420 may control the biometric sensor 451, the touch sensor 452, and/or the display panel 440, independently from the first processor 410.

The electronic device 400 may include a memory 430. The memory 430 may include a normal area for storing for example user applications, and a secured area for storing sensitive information such as information for sensing fingerprints.

The display 440 may include a display panel 442, which includes a plurality of pixels, and a display driving module 441 (e.g., display driver integrated circuit (DDI)) configured to control at least some of the plurality of pixels in the display panel 442 to provide display information. According to an embodiment of the present disclosure, the sensor 450 may include a biometric sensor 451 (e.g., fingerprint sensor) for sensing the user's fingerprint on the display module 440 and a touch sensor 452 for sensing the user's touch on the display module 440. As disclosed above, the biometric sensor 451 may be an optical fingerprint sensor (e.g., an image sensor) adopting light outputted from the display module as its light source or an ultrasonic wave fingerprint sensor having an ultrasonic wave transmitter/receiver.

User input or fingerprint detected by the at least one sensor 450 may drive the plurality of pixels in the display panel 442 through the display driving module 441. The at least one sensor 450 also may control the display panel 442 to the extent necessary for the operations of the sensor. For example, when the biometric sensor 451 is an optical sensor, it may control the display panel 442 to output sufficient light for biometric detection.

When the fingerprint sensor is mounted inside the display, the display pixel structure may partially be changed to accommodate the fingerprint sensor. Detailed descriptions of the changed pixel structure are presented below.

Figure 6:
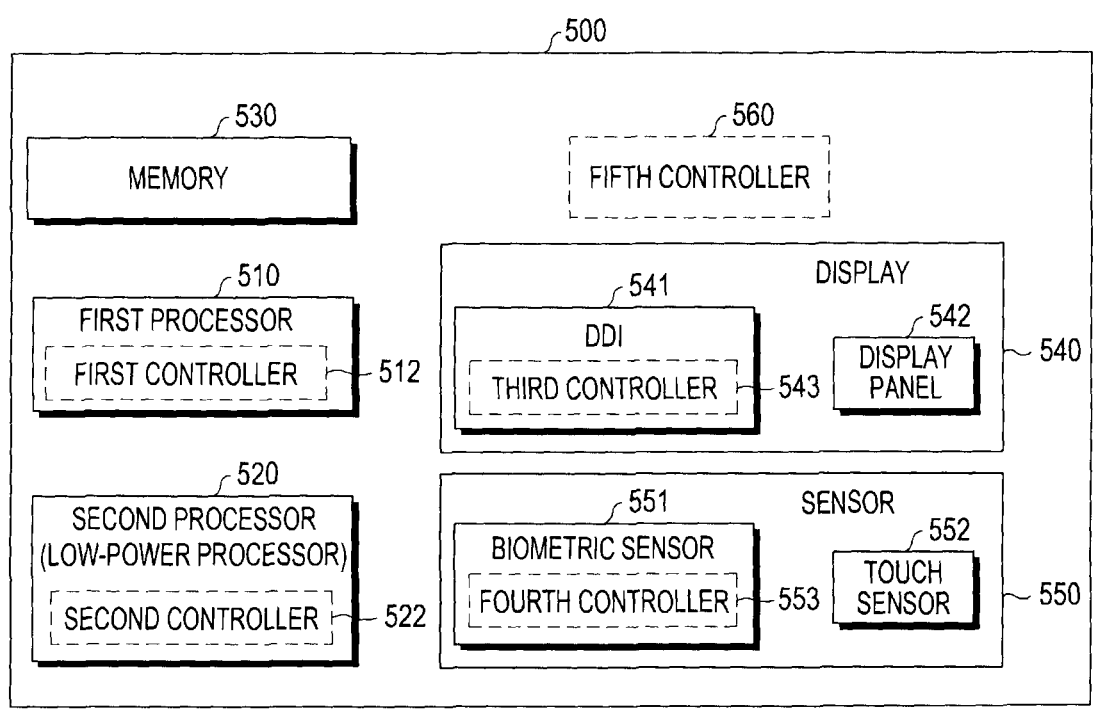
FIG. 6 is a block diagram of an electronic device 500 according to an embodiment of the present disclosure.

FIG. 6 is a block of an electronic device 500 according to an embodiment of the present disclosure.

Referring to FIG. 6, the electronic device 500 may include at least one processor (e.g., a first processor 510 or a second processor 520), a memory 530, a display 540, at least one sensor 550, and/or a plurality of controllers. The processor 510 or 520, memory 530, and display 540 of the electronic device 500 shown in FIG. 6 may partially or wholly be the same as the processor 410 or 420, memory 430, and display 440 of FIG. 5.

According to an embodiment of the present disclosure, the electronic device 500 may include a plurality of controllers (e.g., a first controller 512, a second controller 522, a third controller 543, a fourth controller 553, or a fifth controller 560), and each of the controllers may be included in its module (e.g., the first processor 510, the second processor 520, the DDI 541, or the biometric sensor 551) of the electronic device 500. For example, the electronic device 500 may control the first processor 510 using the first controller 512 and the second processor 520 using the second controller 522. The electronic device 500 may control the module including the third controller 543 and the fourth controller 553 using the third controller 543 and the fourth controller 553, respectively.

Alternatively, one controller may be used to control the modules of the electronic device 500. For example, the electronic device 500 may control a plurality of controllers (e.g., the first controller 512, the second controller 522, the third controller 543, and the fourth controller 553) using a main controller (e.g., the fifth controller 560). The electronic device may designate the fifth controller as the main controller and control the other controllers with the designated main controller. For example, the electronic device 500 may change the main controller from the fifth controller 560 to the first controller 512, and the electronic device 500 may control the other controllers using the designated main controller.

Still in another alternative embodiment, the electronic device 500 may use one controller to directly control the modules in the electronic device 500. For example, the electronic device 500 may control the second processor 520, the memory 530, the display 540, and/or at least one sensor 450 using the first controller 512 included in the first processor 510. The display 540 and at least one sensor 550 may be controlled by one controller. For example, in the case of an optical fingerprint sensor adopting the display 540 as the light source, the display 540 and at least one sensor 550 may be controlled using one controller, and the user's biometric information may easily be obtained by the optical fingerprint sensor.

Figure 7:
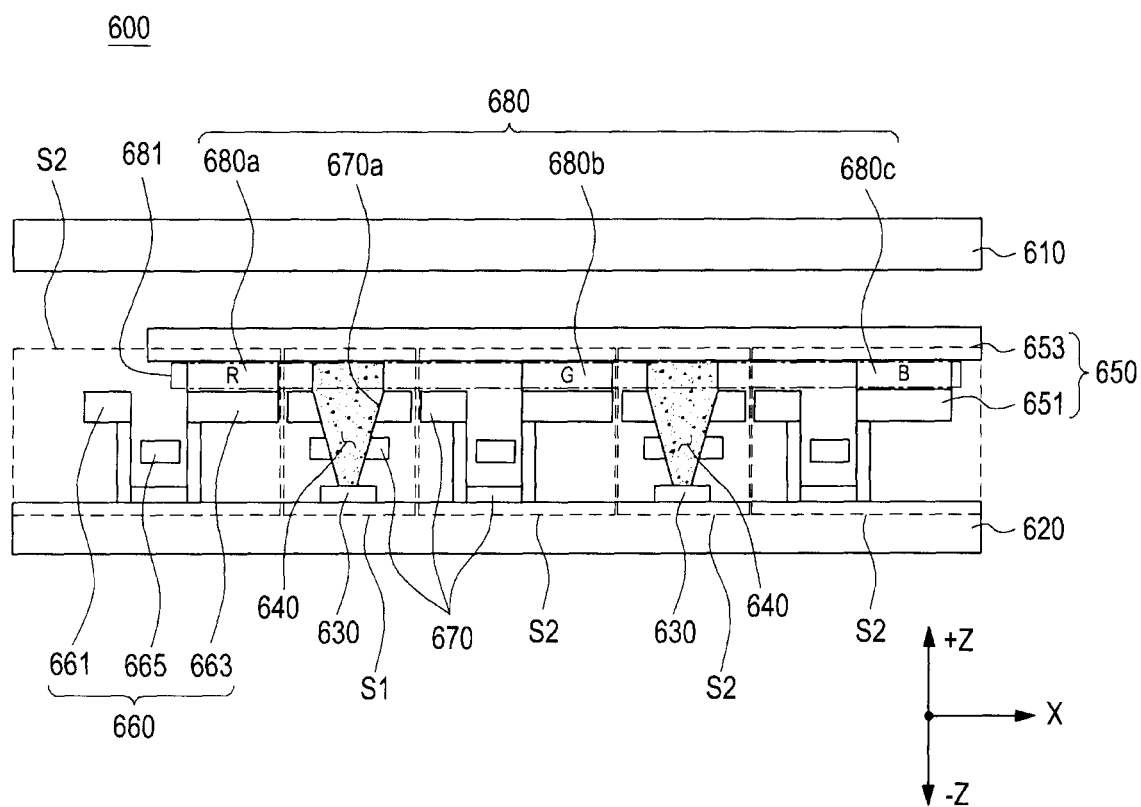
FIG. 7 is a cross-sectional view of FIG. 2, according to an embodiment of the present disclosure.

FIG. 7 is a cross-sectional view of FIG. 2, according to an embodiment of the present disclosure. The biometric sensor 630 and the plurality of pixels 680 of the display 600 shown in FIG. 7 may partially or wholly be the same as the sensor 450 and the pixels in the display panel 442 of the display panel 440 of FIG. 5.

Referring to FIG. 7, the display 600 may include transparent plates 610 and 620 making up the front and rear surface of the display 600, at least one electrode 650, a transistor 660, a plurality of pixels 680, a thin film transistor (TFT) layer 670, a waveguide 640, and at least one biometric sensor 630.

According to an embodiment of the present disclosure, the display 600 may include a first transparent plate 610 facing in the first direction +Z and a second transparent plate 620 facing in the opposite second direction −Z. At least one electrode may be disposed between the first transparent plate 610 and the second transparent plate 620. For example, display electrodes 651 and 653 may be provided between the first transparent plate 610 and the second transparent plate 620.

The first transparent plate 610 may be made of various organic or inorganic materials. For example, the first transparent plate 610 may include an organic light emitting diode (OLED) structure. Alternatively, the first transparent plate 610 may be formed with a single inorganic layer.

The second transparent plate 620 may be made with various materials such as acrylonitrile butadiene styrene (ABS), acrylic resin, polycarbonate (PC), polymethyl methacrylate (PMMA), polyimide (PI), polyethylene terephthalate (PET), polypropylene terephthalate (PPT), amorphous polyethylene terephthalate (APET), polyethylene naphthalate terephthalate (PEN), polyethylene terephthalate glycol (PETG), tri-acetyl-cellulose (TAC), cyclic olefin polymer (COP), cyclic olefin copolymer (COC), polydicyclopentadiene (DCPD), cyclopentdienyl anions (CPD), polyarylate (PAR), polyethersulfone (PES), poly ether imide (PEI), modified epoxy resin, etc.

The display 600 may include a first electrode 651 and/or a second electrode 653. These electrodes may include transparent or opaque conducting material. For example, the first electrode 651 and/or the second electrode 653 may include, as the transparent material, indium-tin-oxide (ITO), indium-zinc-oxide (IZO), poly (3,4-ethylenedioxythiophene) (PEDOT), silver (Ag) nanowire, transparent polymer conductor, graphene, etc. On the other hand, the first electrode 651 and/or the second electrode 653 may include, as the opaque material, silver (Ag), copper (Cu), magnesium (Mg), titanium (Ti), molybdenum (Mo), aluminum (Al), graphene, etc.

The display 600 may include a control circuit (not shown) electrically connected to the first electrode 651 and/or the second electrode 653. The control circuit may use the first electrode 651 and the second electrode 653 to display visual information on the display 600.

The display 600 may further include a transistor (e.g., a TFT) 660 electrically connected to the first electrode 651 and/or the second electrode 653. The transistor 660 may include a gate electrode 665, a source electrode 661, and a drain electrode 663.

The transistor (e.g., a TFT) 660 may be made using a low-temperature polysilicon (LTPS) TFT process. For example, the process may include depositing a shielding layer and an active layer on the second transparent plate 620, forming a pattern through a gate insulating film and the gate electrode 665, activating ions by injecting PMOS ions, and then forming an intermediate insulating film and a pattern for the source electrode 661 and the drain electrode 663. Thereafter, a protecting film may be deposited, and a pattern for pixel electrodes may be formed. The shielding layer, gate insulating film, intermediate insulating film, and protecting film may be collectively referred to as the TFT layer 670.

A plurality of TFT layers 670 deposited in the display 600 may be disposed between the second transparent plate 620 and the layer where the plurality of pixels 680 are formed. The TFT layers 670 of the display 600 may include at least one opening 670a for the biometric sensor 630.

The at least one opening 670a may be disposed in a first area S1, which is different from the second area S2 where the pixels 680 is disposed. According to an embodiment of the present disclosure, multiple opaque wires and electrodes (refer to FIG. 9) may be arranged inside the display 600, and the opening 670a may be formed in the first area S1 where the multiple opaque wires and electrodes are arranged.

The openings 670a may be formed in the area where the biometric sensor 630 is disposed, such that the opening 670a forms a path along which light or sound waves generated from or received by the biometric sensor 630 may propagate.

The display 600 may include an array of a plurality of pixels 680 between the first electrode 651 and/or the second electrode 653. As disclosed above, the first electrode 651 and/or the second electrode 653 may be transparent conducting films (TCF) positioned on the TFT layers 670. An indium tin oxide (ITO) layer may be included as part of the array of multiple pixels 680 and may be provided as a transparent conducting film for the biometric sensor 630. The electrodes of the transparent conducting film for the biometric sensor 630 may be utilized as a receive (Rx) bias electrode. However, the biometric sensor 630 is not limited as being disposed in the above-described positions, and it may rather be implemented in other various positions where biometric information may be recognized. For example, the biometric sensor 630 may be disposed under the second transparent plate 620 (e.g., corresponding to the biometric sensor 350b of FIG. 4). In another example not shown in the figures, the biometric sensor 630 may be formed in-cell inside the display 600.

The TCF electrode (e.g. the first electrode 651 and/or the second electrode 653) may be used as a common electrode for the plurality of pixels 680 and the biometric sensor 630. The TCF electrode may be attached to the array of the plurality of pixels 680. The array of the pixels 680 may include three individual color filter elements such as a red color filter 680a, a green color filter 680b, and a blue color filter 680c for each display pixel. The color filter elements may be formed on a color filter substrate, such as a glass or plastic layer. A polarizing filter (not shown) may be disposed on the color filter array. Hereinafter, the red element 680a may be referred to a first pixel, the green element 680b may be referred to a second pixel, and the blue element 680c may be referred to a third pixel.

The display 600 may include a waveguide 640 formed inside the opening 670a of the TFT layers 670. The waveguide 640 may be filled with a material so that light or sound waves generated from or received by the biometric sensor 630 can effectively propagate.

The waveguide 640 and the transparent cover (the transparent cover 203 of FIG. 2) may be made with the same or similar materials. For example, the waveguide 640 may be made with inorganic materials such as SiOx or SiNx, where x may be a positive integer. The inorganic material may fill the opening 670a and be the same inorganic material from which the first transparent plate 610 is made, thereby minimizing the refraction and interference of light or sound waves.

The waveguide 640 may be in contact with the biometric sensor 630 but not overlap the wires and electrodes arranged on the TFT layers 670.

According to an embodiment of the present disclosure, the biometric sensor may be an ultrasonic wave fingerprint sensor. The ultrasonic wave fingerprint sensor may detect the positions of ridges and/or valleys formed in the user's fingerprint. The ultrasonic wave fingerprint sensor may include its own ultrasonic transmitter and receiver and may measure distances to the ridges and valleys using sound waves of about 20 kHz. According to an embodiment of the present disclosure, ultrasonic waves generated from the transmitter of the ultrasonic wave fingerprint sensor may pass through the waveguide 640 and the transparent cover 203 to the user's finger that contacts the fingerprint sensing area A of the transparent cover 403. These ultrasonic waves may be reflected by the ridge and/or valley of the user's fingerprint, such that they are received by the receiver of the ultrasonic wave fingerprint sensor. Ultrasonic waves hitting a valley requires more time to travel to the receiver of sensor than ultrasonic waves hitting a ridge. Accordingly, by analyzing the differences in arrival times of the received ultrasonic waves, the ultrasonic wave fingerprint sensor may sense the user's fingerprint.

Now described is the structure in which the opening 670a of the TFT layer 670 and the waveguide 640 are formed.

Figure 8:
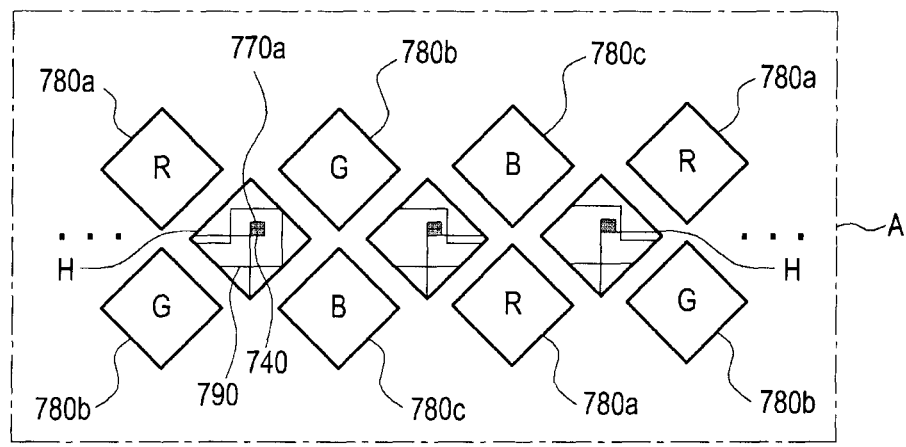
FIG. 8 is a view schematically illustrating the structure of a plurality of pixels 780 and a waveguide 740 formed in a display according to an embodiment of the present disclosure.
Figure 9:
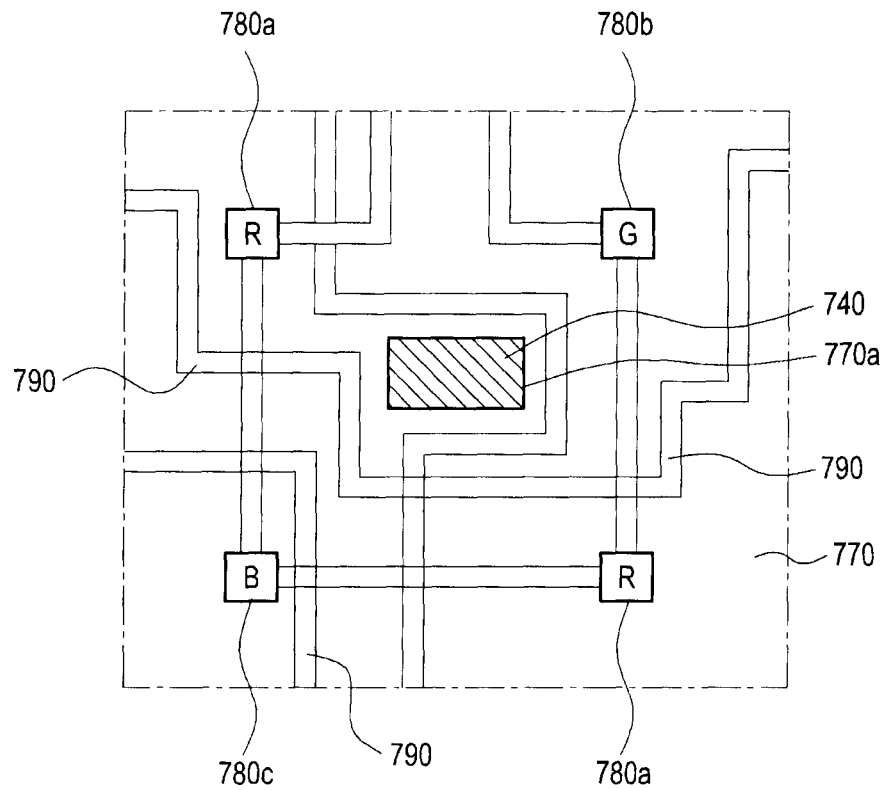
FIG. 9 is a view schematically illustrating a waveguide 740 and a TFT layer 770 under the layer where the plurality of pixels 780 is formed in a display according to an embodiment of the present disclosure.

FIG. 8 is a view schematically illustrating the structure of a plurality of pixels 780a, 780b, and 780c and a waveguide 740 formed in a display according to an embodiment of the present disclosure. FIG. 9 is a view schematically illustrating a waveguide 740 and a TFT layer 770 under the layer where the plurality of pixels 780a, 780b, and 780c is formed in a display according to an embodiment of the present disclosure.

The structure of the plurality of pixels 780a, 780b, and 780c, TFT layer 770, opening 770a, and waveguide 740 of the display shown in FIGS. 8 and 9 may partially or wholly be the same as the structure of the plurality of pixels 680a, 680b, and 680c, TFT layer 670, opening 680a, and waveguide 640 of FIG. 7.

According to an embodiment of the present disclosure, the display may include a plurality of pixels 780a, 780b, and 780c, a plurality of TFT layers (the TFT layers 670 of FIG. 7), and a biometric sensor (the biometric sensor 630 of FIG. 7) between a first transparent plate and a second transparent plate.

Referring to FIG. 8, part of the waveguide 740 and the plurality of pixels 780a, 780b, and 780c may be formed in a fingerprint sensing area (the fingerprint sensing area A of FIG. 2) of the display.

The plurality of pixels 780a, 780b, and 780c may repetitively be arranged at predetermined intervals. For example, the plurality of pixels 780 may include a red color element 780a, a green color element 780b, and a blue color element 780c, and the elements may be repeatedly arranged in the order of R, G, and B in rows and columns.

Since the pixels 780a, 780b, and 780c are arranged such that there is space between them, a predetermined space H may be formed between the pixels arranged in the fingerprint sensing area A. The waveguide 740 may be formed in the space H.

Referring to FIG. 9, the structure of the TFT layers 770 and part of the waveguide 740 may be formed in the fingerprint sensing area A of the display. FIG. 9 illustrates part of one of the TFT layers 770. Other layers of the TFT layers 770 may have similar structures.

According to an embodiment of the present disclosure, the TFT layers 770 may be formed on a base layer (the second transparent plate 620 of FIG. 7) using an LTPS TFT process that may provide better response and stability than existing a-Si FT processes. Multiple opaque wires/electrodes (ELVDD, ELVSS, EM, and Vint) 790 may be formed on the TFT layers 770. In between the multiple opaque wires/electrodes (ELVDD, ELVSS, EM, and Vint) 790, there may be an opening 770a.

The opening 770a of the TFT layers 770 may be implemented so as to not overlap with the multiple opaque wires and electrodes 790 and the plurality of pixels 780a, 780b, and 780c. According to an embodiment of the present disclosure, in the process of implementing the multiple wires and electrodes 790 on the TFT layers 770, the multiple wires and electrodes 790 may be deposited so as to avoid the opening 770a.

The TFT layers 770 may be formed so that each of its layers has an opening 770a in the same area. Accordingly, when the layers are combined, the opening 770a in each layer overlap to create a waveguide that allows for the transmission of light or sound waves to and from the biometric sensor.

As shown in FIG. 8, the opening 770a may be disposed at the center and flanked by the pixels 790a, 780b, and 780c. The opening 770a together with the pixels 790a, 780b, and 780c may be formed as a rectangular set, and this rectangular set may be repetitively patterned in columns and rows. In the FIG. 8 embodiment, the opening 770a is shown as a rectangular opening. However, embodiments of the present disclosure are not limited thereto. For example, the opening 770a may be formed in various shapes in areas where the multiple wires and electrodes 790 are not arranged.

The opening 770a may be filled with an inorganic material to form a waveguide. Thus, mounting space for the biometric sensor may be provided and maximized performance for the biometric sensor may be obtained by simply changing the arrangement of the wires, pixels, and electrodes in conventional displays.

Figure 10A:
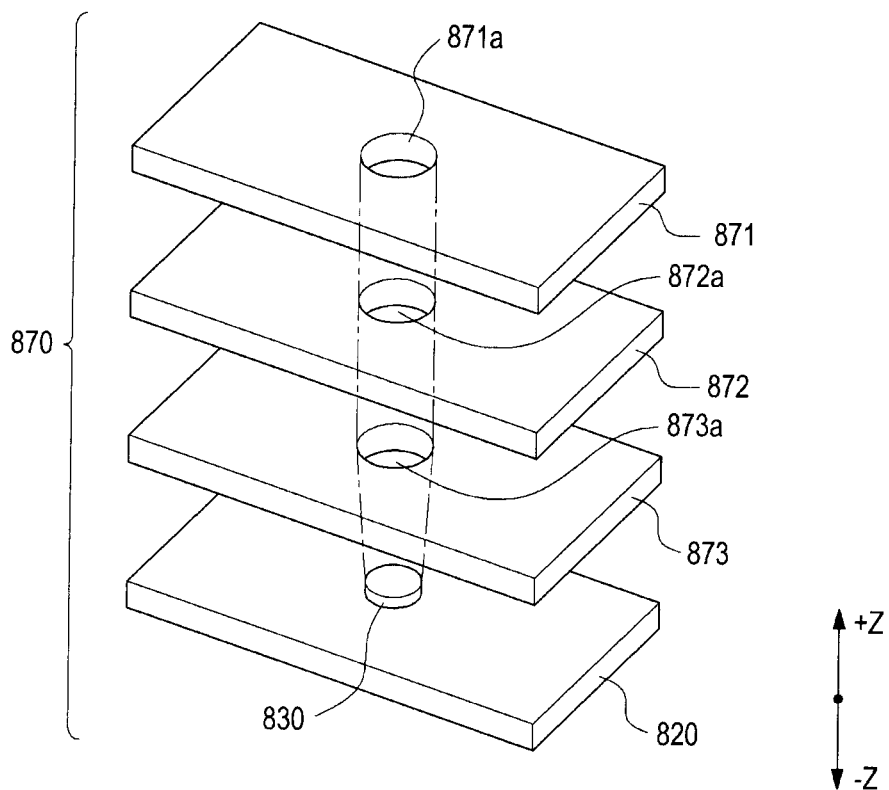
FIG. 10A is an exploded view schematically illustrating the structure of a TFT layer 870 and the structure of an opening 870a disposed on the TFT layer, according to an embodiment of the present disclosure.

FIG. 10A is an exploded view schematically illustrating the structure of a TFT layer 870 and the structure of an opening 870a disposed on the TFT layer, according to an embodiment of the present disclosure. FIG. 10A is a perspective view illustrating the structure of a stacked TFT layer 870 and the structure of a waveguide 840 disposed therein according to an embodiment of the present disclosure.

Figure 10B:
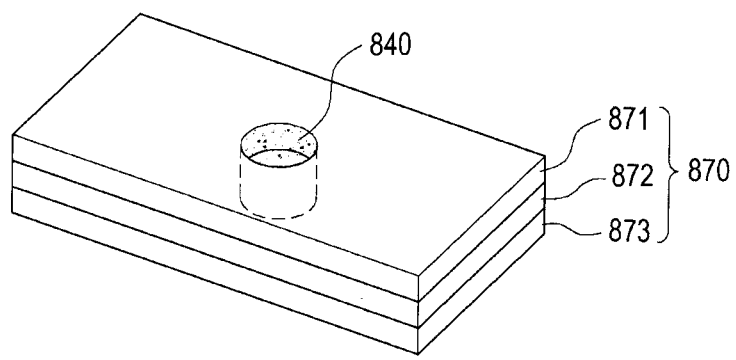
FIG. 10B is a perspective view illustrating the structure of a stacked TFT layer 870 and the structure of a waveguide 840 disposed therein according to an embodiment of the present disclosure.

The structure of the plurality of TFT layers 870, openings 871a, 871b, and 871c, and the biometric sensor 830 shown in FIGS. 10A and 10B may partially or wholly be the same as the structure of the plurality of TFT layers 670, opening 670a, and biometric sensor 630 of FIG. 7.

Referring to FIGS. 10A and 10B, the TFT layer structure 870 may be formed on a base layer (e.g., the second transparent plate 820) using a LTPS TFT process. As set forth above, the plurality of TFT layers may form a stacked structure part of which is schematically shown in FIG. 10. The TFT layer structure 870 may include a first TFT layer 871, a second TFT layer 872, and a third TFT layer 873. The first TFT layer 871, the second TFT layer 872, and the third TFT layer 873, respectively, may include a first opening 871a, a second opening 872a, and a third opening 873a.

According to an embodiment of the present disclosure, the first TFT layer 871 may be disposed under a plurality of pixels (the pixels 680 of FIG. 7), and the third TFT layer 873 may be disposed above the second transparent plate 820. For example, the third TFT layer 873, the second TFT layer 872, and the first TFT layer 871 may sequentially be disposed in the +Z direction in relation to the second transparent plate 820.

The first, second, and third TFT layer 871, 872, and 873 may be the shielding layer, the gate insulating layer, the intermediate insulating layer, and/or the protecting layer described above.

The openings 871a, 872a, and 873a may be arranged in a predetermined order. For example, the first opening 871a, the second opening 872a, and the third opening 873a may be centered on the same axis, and may have the same diameter, so that when the first, second, and third TFT layers 871, 872, and 873 are assembled, the first opening 871a, the second opening 872a, and the third opening 873a substantially overlap. "Substantially overlap" in this case may mean that the openings sufficiently overlap to allow enough light and/or sound waves to transmit to allow the biometric sensor to operate. The first opening 871a, the second opening 872a, and the third opening 873a, when assembled, may form a cylindrical shape. The top of the cylinder may face the space between the plurality of pixels 680, and the bottom of the cylinder may face the biometric sensor 830.

According to an embodiment of the present disclosure, when the openings are filled with an inorganic material to form the waveguide 840, there may be provided a path along which light or sound waves for transmission/reception to/from the biometric sensor 830 can travel. The biometric sensor 830 may be disposed on a front surface of the second transparent plate 820. For example, where the biometric sensor 830 is an ultrasonic wave fingerprint sensor, ultrasonic waves may be transmitted or received via the waveguide 840.

Figure 11A:
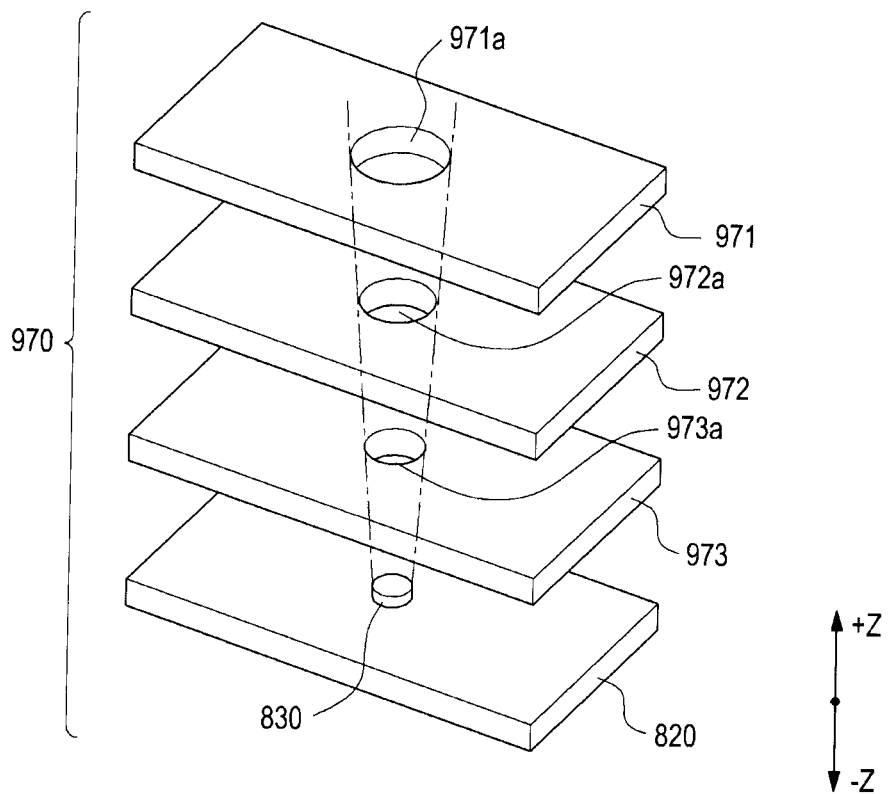
FIG. 11A is an exploded view schematically illustrating the structure of a TFT layer 970 and the structure of an opening 970a disposed on the TFT layer, according to an embodiment of the present disclosure.
Figure 11B:
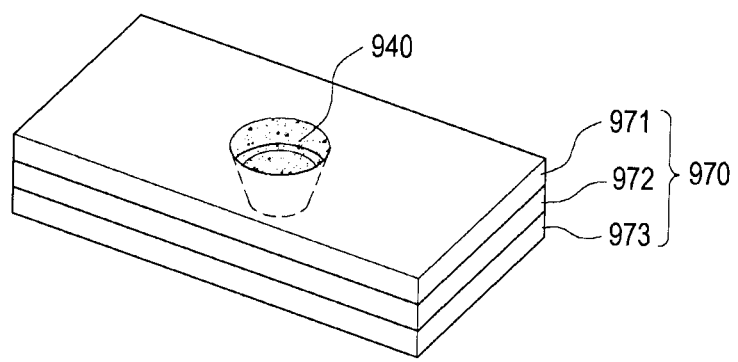
FIG. 11B is a perspective view illustrating the structure of a stacked TFT layer 970 and the structure of a waveguide 940 disposed therein according to an embodiment of the present disclosure.

FIG. 11A is an exploded view schematically illustrating the structure of a TFT layer 970 and the structure of an opening 970a disposed on the TFT layer, according to an embodiment of the present disclosure. FIG. 11B is a perspective view illustrating the structure of a stacked TFT layer 970 and the structure of a waveguide 940 disposed therein according to an embodiment of the present disclosure.

The structure of the plurality of TFT layers 970, openings 971a, 971b, and 971c, and the biometric sensor 930 shown in FIGS. 11A and 11B may partially or wholly be the same as the structure of the plurality of TFT layers 670, opening 670a, and biometric sensor 630 of FIG. 7.

Referring to FIGS. 11A and 11B, the TFT layer structure 970 may be formed on a base layer (e.g., the second transparent plate 920) using a LTPS TFT process. As set forth above, the plurality of TFT layers may form a stacked structure part of which is schematically shown in FIG. 11. The TFT layer structure 970 may include a first TFT layer 971, a second TFT layer 972, and a third TFT layer 973. The first TFT layer 971, the second TFT layer 972, and the third TFT layer 973, respectively, may include a first opening 971a, a second opening 972a, and a third opening 973a. The description below focuses only on the differences from FIGS. 10A and 10B.

According to an embodiment of the present disclosure, the openings 971a, 972a, and 973a may be arranged in a predetermined order. The openings 971a, 972a, and 973a may have different sizes. For example, the first opening 971a, the second opening 972a, and the third opening 973a may be centered on the same axis, and the first opening 971a, the second opening 972a, and the third opening 973a may have different diameters.

The openings 971a, 972a, and 973a may have diameters that sequentially increase. For example, the second opening 972a may be smaller in diameter than the first opening 971a, and the third opening 973a may be smaller in diameter than the second opening 972a. Alternatively, the second opening 972a may be larger in diameter than the first opening 971a, and the third opening 973a may be larger in diameter than the second opening 972a.

Where the TFT layers are stacked one over another, the first opening 971a, the second opening 972a, and the third opening 973a may be shaped as a truncated cone or an inverted truncated cone. The top of the truncated cone may face the space between the plurality of pixels 680, and the bottom of the truncated cone may face the biometric sensor 830.

In the case of an inverted truncated cone shape, wherein the bottom is narrower than the top, the third opening 973a may have the smallest diameter among the openings. The diameter of the third opening 973a may be sized to be able to deliver sufficient light or sound waves to the biometric sensor 930 disposed thereunder. Alternatively, in the case of a truncated cone shape, wherein the top is narrower than the bottom, the first opening 971a may have the smallest diameter among the openings. The diameter of the first opening 971a may be sized so that sufficient light can pass through the waveguide.

According to an embodiment of the present disclosure, when the openings are filled with an inorganic material to form the waveguide 940, there may be provided a path along which light or sound waves for transmission/reception to/from the biometric sensor 930 can travel. The biometric sensor 930 may be disposed on a front surface of the second transparent plate 920. For example, where the biometric sensor 830 is an ultrasonic wave sensor, ultrasonic waves may be transmitted or received via the waveguide 940.

Although in the above examples the openings and waveguide have been illustrated to be shaped as cylinders or truncated cones, the structure of the openings and the waveguide is not limited thereto. For example, the openings and waveguide may also be formed in other various shapes or structures, such as shapes in which the diameters increase stepwise, curved and inclined shapes, or other shapes or structures enabling sufficient delivery of light or sound waves.

Figure 12:
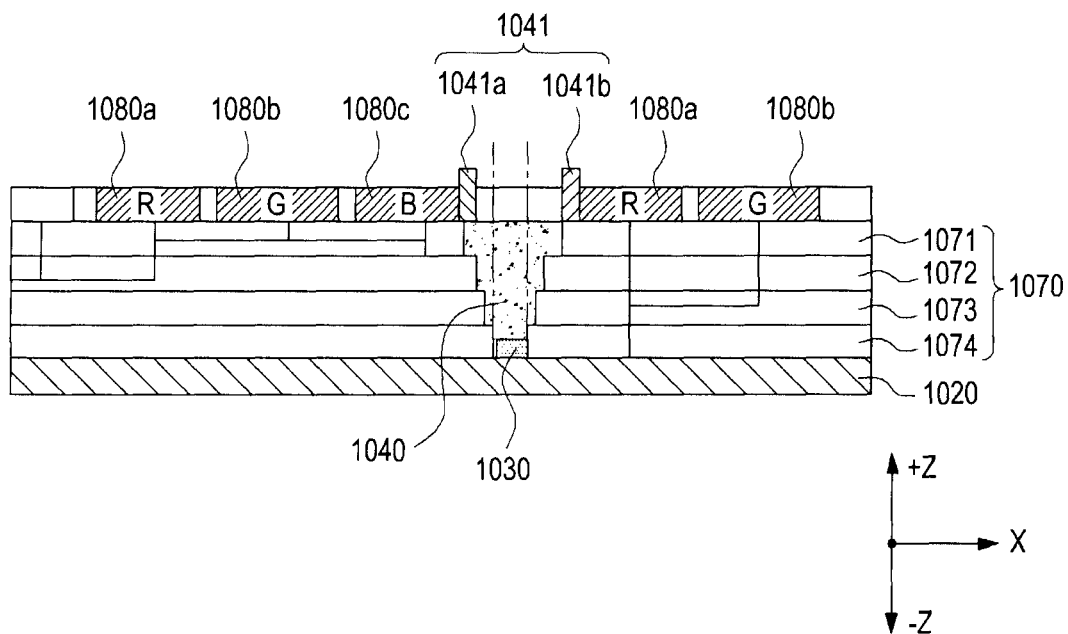
FIG. 12 is a cross-sectional view illustrating a TFT layer structure 1070 including the structure of a waveguide 1040 formed in a display according to an embodiment of the present disclosure.

FIG. 12 is a cross-sectional view illustrating a TFT layer structure 1070 including the structure of a waveguide 1040 formed in a display according to an embodiment of the present disclosure.

The structure of the plurality of TFT layers 1070, waveguide 1040, and the biometric sensor 1030 of the display shown in FIG. 12 may partially or wholly be the same as the structure of the plurality of TFT layers 670, waveguide 640, and biometric sensor 630 of FIG. 7.

Referring to FIG. 12, the display may sequentially include a plurality of TFT layers 1071, 1072, 1073, and 1074 stacked one over another in the +Z direction in relation to a base layer (e.g., the second transparent plate 1020). The display may also include a plurality of pixels 1080a, 1080b, and 1080c arranged on the same plane. Each of the plurality of TFT layers 1071, 1072, 1073, and 1074 may include an opening. The openings may form a truncated cone shape. The biometric sensor 1030 may be disposed on a top surface of the second transparent plate 1020.

According to an embodiment of the present disclosure, the biometric sensor 1030 may be an ultrasonic wave fingerprint sensor. To minimize the influence of ultrasonic waves transmitted and received by the ultrasonic wave fingerprint sensor 1030 on the pixels 1080a, 1080b, and 1080c, at least one shielding wall 1041 may be formed around the pixels 1080a, 1080b, and 1080c.

The shielding wall 1041 may protrude in the +Z direction and may be disposed between the pixels. For example, where the waveguide 1040 is disposed between the blue pixel 1080c and the red pixel 1080a, the shielding wall 1041 may be disposed to face a side of the blue pixel 1080c and a side of the red pixel 1080a. The shielding wall 1041 may include a first shielding wall 1041a at the side of the blue pixel 1080c and a second shielding wall 1041b at the side of the red pixel 1080a. As another example, the shielding wall 1041 may be a circular wall when the waveguide 1040 is shaped as a cylinder, or be a rectangular wall when the cross section of the waveguide 1040 is rectangular.

The bottom of the shielding wall 1041 is disposed on the top surface of the uppermost TFT layer 1071, and the top of the shielding wall 1041 may be disposed to face the display electrode (the second electrode 653 of FIG. 7). The shielding wall 1041 may protrude in the +Z direction such that, as shown in FIG. 12, the top of the shielding wall 1041 is higher than the top surface of the pixel 1080.

The shielding wall 1041 may be disposed on the waveguide 1040. Where there is a plurality of waveguides 1040, a plurality of the shielding wall 1041 may be provided for each waveguide 1040. When the shielding wall 1041 is a circular wall, the inner diameter of the shielding wall 1041 may be designed to be larger than the biometric sensor 1030 so that the shielding wall 1041 does not interfere with the light or the sound waves travelling in the waveguide 1040.

According to an embodiment of the present disclosure, such shielding wall 1041 may minimize interference between the pixels (e.g. the red, green, and blue pixels 1080a, 1080b, and 1080c) and the light or sound waves generated or received by the biometric sensor 1030. At the same time, the shielding wall 1041 may work to concentrate or focus the light or sound waves generated or received by the biometric sensor 1030.

Figure 13:
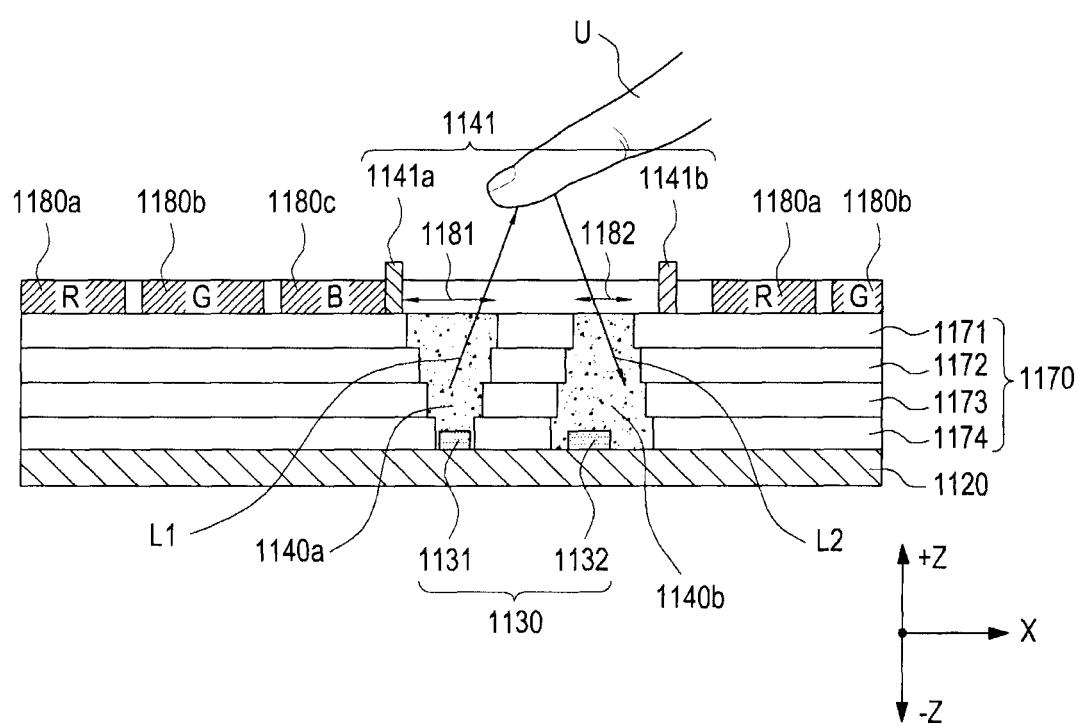
FIG. 13 is a cross-sectional view illustrating a TFT layer structure 1170 including the structure of a plurality of waveguides 1140 formed in a display according to an embodiment of the present disclosure.

FIG. 13 is a cross-sectional view illustrating a TFT layer structure 1170 including the structure of multiple waveguides 1140 formed in a display according to an embodiment of the present disclosure.

The structure of the plurality of TFT layers 1170, waveguide 1140, and the biometric sensor 1130 of the display shown in FIG. 13 may partially or wholly be the same as the structure of the plurality of TFT layers 670, waveguide 640, and biometric sensor 630 of FIG. 7.

Referring to FIG. 13, the display may sequentially include a plurality of TFT layers 1171, 1172, 1173, and 1174 stacked one over another in the +Z direction in relation to a base layer (e.g., the second transparent plate 1120). The display may also include a plurality of pixels 1180a, 1180b, and 1180c arranged on the same plane. Each of the plurality of TFT layers 1171, 1172, 1173, and 1174 may include two openings. The openings may form waveguides 1140a and 1140b filled with an inorganic material. The waveguides 1140a and 1140b may form two truncated cone shapes. A biometric sensor 1130 may be disposed on a top surface of the second transparent plate 1120.

According to an embodiment of the present disclosure, the biometric sensor 1130 may be an ultrasonic wave fingerprint sensor. The ultrasonic wave fingerprint sensor 1130 may include a fingerprint sensor transmit (Tx) electrodes 1131 and a fingerprint sensor receive (Rx) electrodes 1132. The display may include a plurality of biometric sensors such that the Tx electrode and Rx electrodes of the sensors are alternatingly arranged.

The fingerprint sensor Tx electrodes 1131 may generate and radiate ultrasonic waves towards the transparent cover (the transparent cover 203 of FIG. 2) of the display. The radiated ultrasonic waves may be reflected by the user's fingerprint towards the fingerprint sensor Rx electrodes 1132. For example, the fingerprint sensor Tx electrodes 1131 may send ultrasonic waves along a first path L1 formed in the first waveguide 1140a, and the fingerprint sensor Rx electrodes 1132 may receive ultrasonic waves reflected by the fingerprint along a second path L2 formed in the second waveguide 1140b.

A plurality of waveguides 1140a and 1140b may be provided. The waveguides 1140a and 1140b may include a first waveguide 1140a in a position corresponding to the fingerprint sensor Tx electrodes 1131 and a second waveguide 1140b in a position corresponding to the fingerprint sensor Rx electrodes 1132.

The first waveguide 1140a and the second waveguide 1140b may be configured in forms or shapes appropriate for transmission or reception. For example, the first waveguide 1140a may be shaped to better enable transmission towards the transparent cover. Accordingly, the first waveguide 1140a may be shaped as a truncated cone that gradually enlarges (e.g., its diameter increases) along the +Z direction. Thus, the first waveguide 1140a may be configured so that its output part 1181 has the largest diameter. On the other hand, the second waveguide 1140b may be shaped to better enable transmission towards the fingerprint sensor Rx electrodes 1132. Accordingly, the second waveguide 1140b may be shaped as a truncated cone that gradually enlarges (e.g., its diameter increases) along the −Z direction. Thus, the second waveguide 1140b may be configured so that its input part 1182 has the largest diameter.

The output part 1181 of the waveguide path of the first waveguide 1140a and the input part 1182 of the waveguide path of the second waveguide 1140b may be positioned in the same layer as the red, green, and blue pixels 1180a, 1180b, and 1180c. However, the structure of the waveguides 1140a and 1140b is not limited thereto. Rather, the waveguides 1140a and 1140b may also be configured in other various shapes or structures depending on the pixel size and the interval between the pixels. Further, the size, position, and number of the waveguides may also be various for enabling precise detection of the user's fingerprint.

According to an embodiment of the present disclosure, to minimize interference between the ultrasonic waves transmitted and received by the ultrasonic wave fingerprint sensor 1130 and the display pixels 1180*a*, 1180*b*, and 1180*c*, a shielding wall 1141 may be formed around the pixels 1180*a*, 1180*b*, and 1180*c*. The shielding wall 1141 may be formed around the collective first waveguide 1140*a* and the second waveguide 1140*b*. The shielding wall 1141 may protrude in +Z direction and may be disposed between the pixels. Such shielding wall 1141 may minimize interference between the pixels (e.g. the red, green, and blue pixels 1180*a*, 1180*b*, and 1180*c*) and the light or sound waves generated or received by the biometric sensor 1130. At the same time, the shielding wall 1141 may work to concentrate or focus the light or sound waves generated or received by the biometric sensor 1130.

According to an embodiment of the present disclosure, an electronic device may comprise a housing forming a first portion of an outer surface of the electronic device and a display received in the housing and forming a second portion of the outer surface. The display may include a biometric sensor formed between a first pixel and a second pixel and a waveguide substantially perpendicular to the biometric sensor and extending from the biometric sensor to the second portion.

According to an embodiment of the present disclosure, the first portion of the outer surface of the housing may include a first surface facing in a first direction and a second surface facing in a second direction opposite to the first direction, and the display disposed between the first surface and the second surface of the housing may include a pixel layer including a plurality of pixels and one or more thin film transistors (TFT) layers disposed under, or on the same plane as, the pixel layer and including at least one opening. The biometric sensor may be disposed under the one or more TFT layers to coincide with the at least one opening and may be configured to receive light or sound wave, and the waveguide may be formed in the at least one opening and may form a path along which the light or sound wave propagates between the biometric sensor and the pixel layer.

According to an embodiment of the present disclosure, the display may include a transparent cover and a display panel disposed under the transparent cover. When viewed from above the transparent cover, the waveguide and the biometric sensor may substantially overlap.

According to an embodiment of the present disclosure, the display may include an electrode or a wire that may be disposed on the pixel layer or the one or more TFT layers in an area around the at least one opening.

According to an embodiment of the present disclosure, the waveguide and the transparent cover may be made of the same inorganic material so that refraction of the light or sound wave passing through the waveguide and the transparent cover is minimized.

According to an embodiment of the present disclosure, a surface of the waveguide facing in the second direction may be disposed adjacent to a surface of the biometric sensor facing in the first direction.

According to an embodiment of the present disclosure, the one or more TFT layers may include a plurality of TFT layers each having an opening, the plurality of openings centered on the same axis.

According to an embodiment of the present disclosure, the plurality of openings may include openings of different sizes.

According to an embodiment of the present disclosure, the plurality of openings may form a truncated cone shape for the waveguide.

According to an embodiment of the present disclosure, the waveguide may be formed by the at least one opening being filled with an inorganic material including SiOx or SiNx, and wherein x is a positive integer.

According to an embodiment of the present disclosure, the biometric sensor may be an ultrasonic wave fingerprint sensor.

According to an embodiment of the present disclosure, the electronic device may further include a shielding wall protruding between at least two pixels in the plurality of pixels in the first direction.

According to an embodiment of the present disclosure, the shielding wall may be formed around the path along which the light or sound wave propagates.

According to an embodiment of the present disclosure a length of the shielding wall in the first direction may be larger than a length of the plurality of pixels in the first direction, and the shielding wall may surround the at least one opening.

According to an embodiment of the present disclosure, the waveguide may include a first waveguide forming a first path along which an ultrasonic wave from the biometric sensor propagates to the transparent cover and a second waveguide forming a second path along which a reflection of the ultrasonic wave by a user's body part propagates to the biometric sensor.

According to an embodiment of the present disclosure, the first waveguide may gradually increase in inner diameter or size in the first direction, and the second waveguide may gradually decreases in inner diameter or size in the first direction.

According to an embodiment of the present disclosure, the biometric sensor may be configured to sense the user's fingerprint that contacts a fingerprint sensing area of the transparent cover.

According to an embodiment of the present disclosure, an electronic device may comprise a housing including at least a portion of an outer surface of the electronic device and a display disposed inside the housing and including a mutually exclusive first area and second area. A biometric sensor and a waveguide may be disposed in the first area on a first layer, the biometric sensor being configured to sense a user's fingerprint, and the waveguide forming a path along with light or sound wave transmitted from or received by the biometric sensor propagates. A plurality of pixels may be arranged in the first area and the second area on at least a second layer different from the first layer.

According to an embodiment of the present disclosure, the display may include a plurality of opaque wires and electrodes that are disposed in the first area without overlapping the waveguide and the biometric sensor.

According to an embodiment of the present disclosure, the electronic device may further comprise a printed circuit board disposed under the display. The biometric sensor may be electrically connected to at least part of the printed circuit board to transmit a signal corresponding to the user's fingerprint.

According to an embodiment of the present disclosure, a display included in an electronic device may comprise a plurality of pixels disposed on a first layer, each pixel configured to output one or more colors, a plurality of TFT layers disposed under the first layer to control the plurality of pixels and including at least one opening, and a waveguide formed in the at least one opening and forms a path for light or sound wave to propagate to a biometric sensor disposed in the display.

As is apparent from the foregoing description, according to an embodiment of the present disclosure, an electronic device includes a biometric sensor that enables biometric information to be obtained within an area in the display. Accordingly, the biometric sensor does not require additional space on the face of the electronic device, and bezels of the electronic device may be minimized.

According to an embodiment of the present disclosure, the biometric sensor may be encapsulated within the display and does not require an additional physical switch, which saves space as well as allows for better waterproofing of the electronic device.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

It is apparent to one of ordinary skill in the art that the electronic devices according to various embodiments of the present disclosure as described above are not limited to the above-described embodiments and those shown in the drawings, and various changes, modifications, or alterations may be made thereto without departing from the scope of the present disclosure.

What is claimed is:

1. An electronic device, comprising:
   a housing forming a first portion of an outer surface of the electronic device; and
   a display received in the housing and forming a second portion of the outer surface, wherein the display includes:
   a plurality of light pixels,
   thin film transistors (TFT) layers including at least one opening formed through the TFT layers,
   at least one waveguide formed in the opening, and
   at least one biometric sensor disposed in the opening,
   wherein the at least one biometric sensor is formed between the plurality of light pixels.

2. The electronic device of claim 1, wherein the first portion of the outer surface of the housing includes a first surface facing in a first direction and a second surface facing in a second direction opposite to the first direction, and
   wherein the display is disposed between the first surface and the second surface of the housing and includes: a light pixel layer including the plurality of light pixels,
   wherein the TFT layers disposed under, or on the same plane as, the light pixel layer and including at least one opening,
   wherein the biometric sensor is disposed in the TFT layers to coincide with the at least one opening and is configured to receive sound waves, and the waveguide is formed in the at least one opening and forms a path along which the sound waves propagates between the biometric sensor and the light pixel layer.

3. The electronic device of claim 2, wherein the display includes a transparent cover and a display panel disposed under the transparent cover, and wherein as viewed from above the transparent cover, the waveguide and the biometric sensor substantially overlap.

4. The electronic device of claim 3, wherein the display includes an electrode or a wire disposed on the light pixel layer or the TFT layers in an area around the at least one opening.

5. The electronic device of claim 4, wherein the waveguide and the transparent cover are made of the same inorganic material so that refraction of the light or sound wave passing through the waveguide and the transparent cover is minimized.

6. The electronic device of claim 4, wherein a surface of the waveguide facing in the second direction is disposed adjacent to a surface of the biometric sensor facing in the first direction.

7. The electronic device of claim 4, wherein the TFT layers include a plurality of TFT layers each having an opening, thereby resulting in a plurality of openings, the plurality of openings centered on the same axis.

8. The electronic device of claim 7, wherein the plurality of openings include openings of different sizes.

9. The electronic device of claim 8, wherein the waveguide includes a first waveguide forming a first path along which an ultrasonic wave from the biometric sensor propagates to the transparent cover and a second waveguide forming a second path along which a reflection of the ultrasonic wave by a user's body part propagates to the biometric sensor.

10. The electronic device of claim 9, wherein the first waveguide gradually increases in size in the first direction, and the second waveguide gradually decreases in size in the first direction.

11. The electronic device of claim 7, wherein the plurality of openings form a truncated cone shape for the waveguide.

12. The electronic device of claim 3, wherein the waveguide is formed by the at least one opening being filled with an inorganic material including SiOx or SiNx, and wherein x is a positive integer.

13. The electronic device of claim 3, further comprising a shielding wall protruding between at least two light pixels in the plurality of light pixels in the first direction.

14. The electronic device of claim 13, wherein the shielding wall is formed around the path along which the light or sound wave propagates.

15. The electronic device of claim 14, wherein a length of the shielding wall in the first direction is larger than a length of the plurality of light pixels in the first direction, and wherein the shielding wall surrounds the at least one opening.

16. The electronic device of claim 3, wherein the biometric sensor is configured to sense a user's fingerprint that contacts a fingerprint sensing area of the transparent cover.

17. The electronic device of claim 16, further comprising a shielding wall protruding between at least two light pixels in the plurality of light pixels in the first direction.

18. An electronic device, comprising:
   a housing including at least a portion of an outer surface of the electronic device; and
   a display disposed inside the housing and including a mutually exclusive first area and second area,
   wherein the display includes:
   thin film transistors (TFT) layers including at least one opening formed through the TFT layers disposed in the first area, a biometric sensor and a waveguide disposed in the opening in the first area on a first layer, a plurality of light pixels is arranged in the first area and the second area on at least a second layer different from the first layer.

19. The electronic device of claim 18, further comprising a printed circuit board disposed under the display, wherein the biometric sensor is electrically connected to at least part of the printed circuit board to transmit a signal corresponding to a user's fingerprint, wherein the display includes a plurality of opaque wires and electrodes that are disposed in the first area without overlapping the waveguide and the biometric sensor.

20. An electronic device including a display, the display comprising:

a plurality of light pixels disposed on a first layer, each pixel configured to output one or more colors;

a plurality of TFT layers disposed under the first layer to control the plurality of pixels and including at least one opening formed through the TFT layers; and a waveguide formed in the at least one opening and forms a path for light or sound wave to propagate to a biometric sensor disposed in the display, wherein the biometric sensor and the waveguide are disposed in the opening.

* * * * *